US008642829B2

(12) United States Patent
Argoud

(10) Patent No.: US 8,642,829 B2

(45) Date of Patent: Feb. 4, 2014

(54) STORAGE CONTAINER FOR SPENT NUCLEAR FUEL WITH IMPROVED CLOSING

(75) Inventor: Jean-Claude Argoud, Montbonnot (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 242 days.

(21) Appl. No.: 13/255,420

(22) PCT Filed: Mar. 9, 2010

(86) PCT No.: PCT/EP2010/052951

§ 371 (c)(1), (2), (4) Date: Dec. 7, 2011

(87) PCT Pub. No.: WO2010/102990

PCT Pub. Date: Sep. 16, 2010

(65) Prior Publication Data

US 2012/0067005 A1 Mar. 22, 2012

(30) Foreign Application Priority Data

Mar. 11, 2009 (FR) ..................................... 09 51519

(51) Int. Cl.
*G21F 1/00* (2006.01)

(52) U.S. Cl.
USPC ........................... 588/16; 588/249.5; 588/900

(58) Field of Classification Search
USPC ........................................ 588/16, 249.5, 900
See application file for complete search history.

(56) References Cited

U.S. PATENT DOCUMENTS

| | | | |
|---|---|---|---|
| 4,445,042 | A | 4/1984 | Baatz et al. |
| 4,737,316 | A | 4/1988 | Macedo et al. |
| 7,743,962 | B2 | 6/2010 | Le Cocq et al. |
| 2004/0020919 | A1 | 2/2004 | Hirano et al. |
| 2006/0118603 | A1 | 6/2006 | Le Cocq et al. |
| 2010/0104061 | A1 | 4/2010 | Argoud |

FOREIGN PATENT DOCUMENTS

| | | | |
|---|---|---|---|
| CN | 100347789 | C | 11/2007 |
| DE | 30 15 553 | C2 | 3/1983 |
| EP | 0 019 544 | | 11/1980 |
| FR | 1 328 540 | | 5/1963 |
| FR | 1 339 587 | | 10/1963 |
| FR | 1 408 832 | | 8/1965 |
| FR | 2 806 828 | | 9/2001 |
| FR | 2 896 614 | | 7/2007 |
| GB | 910902 | | 11/1962 |

OTHER PUBLICATIONS

Preliminary Search Report issued Nov. 23, 2009 in French Application No. 0951519 (With English Translation of Category of Cited Documents).

Combined Office Action and Search Report issued Jul. 9, 2013 in Chinese Patent Application No. 201080011334.9 with English language translation.

Chen Wenzhen, et al. "Heat transfer problem during the self-burial process of a parabolic nuclear waste container" Nuclear Techniques, vol. 18, No. 1, Jan. 1995, pp. 40-43 with English abstract.

Guo-qiang Bao, et al., "Research on high performance concrete applied to nuclear waste container" Concrete, Aug. 2003, pp. 49-52 with English abstract.

*Primary Examiner* — Edward Johnson

(74) *Attorney, Agent, or Firm* — Oblon, Spivak, McClelland, Maier & Neustadt, L.L.P.

(57) ABSTRACT

A container for confining nuclear waste, including a sleeve of longitudinal axis closed at a first longitudinal end by a base and a second longitudinal free end via which the container is designed to be loaded, a plug configured to close the second longitudinal free end tightly, a flange fixed on the inner face of the sleeve to the side of the second longitudinal free end, the plug having at least one external diameter substantially equal to at least one internal diameter of the flange, the plug configured to be welded on the flange such that the welding zone is offset radially towards an interior of the container, relative to an inner face of the sleeve.

14 Claims, 3 Drawing Sheets

Figure 1:
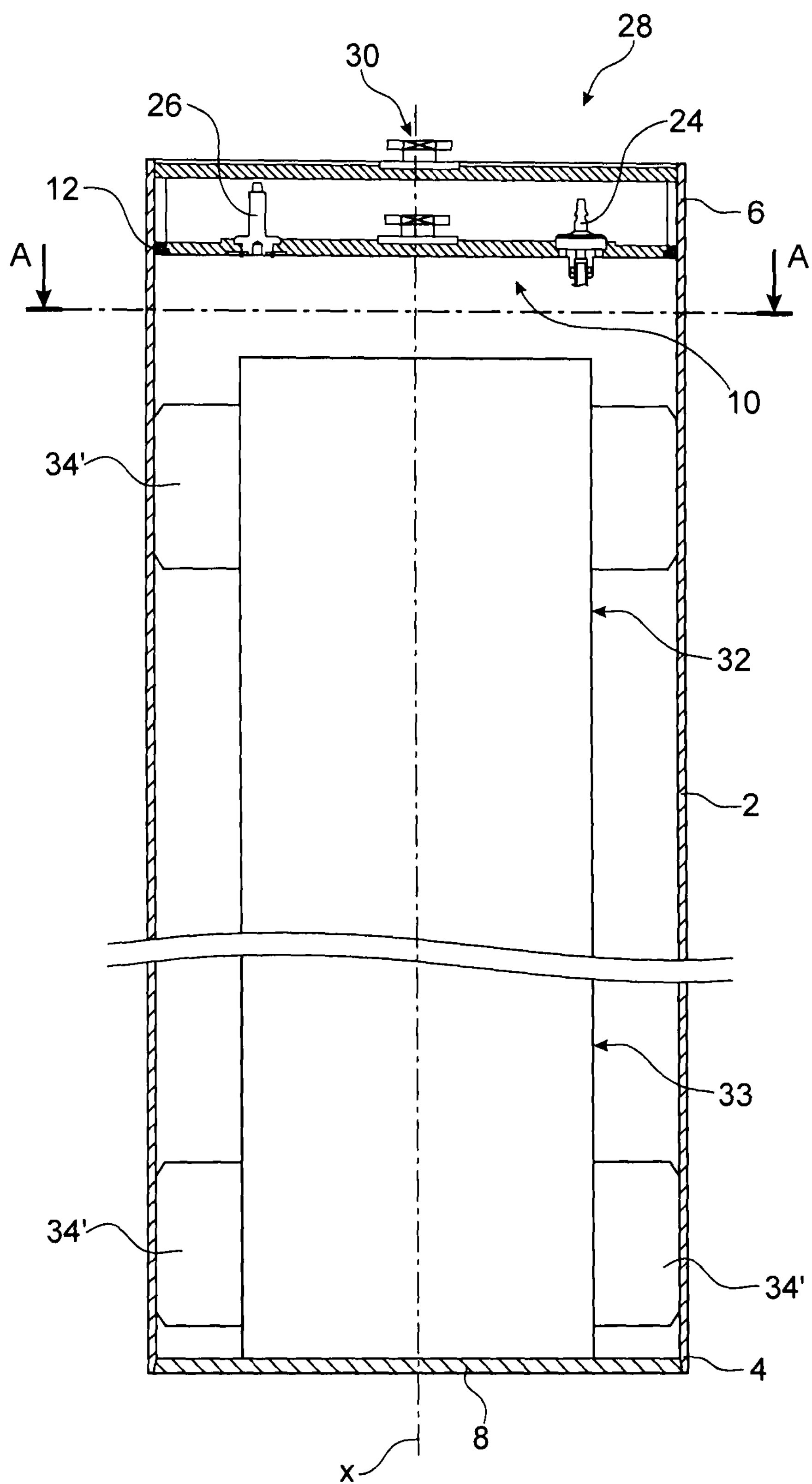

23
12
18
14
16
22
24
21
10

26
28
10
12

28.1
4

29
2
28.2
28

STORAGE CONTAINER FOR SPENT NUCLEAR FUEL WITH IMPROVED CLOSING

TECHNICAL FIELD AND PRIOR ART

The present invention relates to a container for storing nuclear waste, more particularly spent nuclear fuel.

Within the scope of irradiated fuel management, after it is used in a reactor the latter undergoes a cooling step in a pool in a building known as a fuel building, generally located next to the reactor building.

On completion of this cooling step, the irradiated fuel is removed from the pool, and then evacuated to a storage location to wait for definitive discharge which can be either reprocessing or geologic stockpiling.

The cooling step in the pool has limited duration due to the reduced capacity of cooling ponds.

In this context, it is planned to condition the irradiated fuel in containers forming the first confinement barrier, each container in turn being arranged in a container forming a second confinement barrier and ensuring the mechanical performance of the assembly. This container is intended for transport of the container to its provisional storage location. Next, the container is removed from the container stored in an adapted structure.

The container comprises a cylindrical body of circular cross-section, a base welded at one end of the body.

After the fuel is placed in the container, a plug is welded onto the free end of the body, this plug ensuring tight closing of the container and also forming gripping means for moving the container.

The welding of the plug on the body is done by adding wire. Also, a relatively complex welding device needs to be used since it has to assume a particular orientation to ensure that a weld is made between the periphery of the plug and the body of the container.

Also, the weld must be sufficient to lift the container loaded by the plug.

It is consequently an aim of the present invention to provide a container designed to contain spent fuel, having improved closing.

EXPLANATION OF THE INVENTION

The above aim is attained by a container comprising a cylindrical body of circular cross-section, a base sealing a first longitudinal end of said body and a cover designed to block a second longitudinal end of said body, said second longitudinal end comprising a flange projecting from the inner surface of the body and bordering the second end and designed to form a support for the cover, the cover being designed to be welded on the flange.

Thanks to the invention, immobilisation of the plug on the body is not achieved by direct welding of the plug on the body, but of the plug on the flange, the welding zone is offset radially towards the axis of the body, the welding device no longer needing to have a complex orientation, since the welding zone is easily accessible.

In other terms, the invention provides for radially offsetting the welding zone of the plug towards the interior of the container so as to make this zone more accessible to welding means, improving the making of the weld and simplifying the welding means.

It is provided advantageously that the inner surface of the flange comprises a form of step corresponding to a peripheral external profile of the plug. Thus, the plug rests on the flange, and adding material for the weld is not required.

Advantageously, a second plug mainly forming handling means of the container can be used, the first plug forming the sealed barrier. For this, the first plug is arranged set back inside the body, relative to the open end of the body, the second plug being attached to the body to cover the first plug.

The subject-matter of the present invention is mainly a container for confining spent nuclear fuel, comprising a sleeve of longitudinal axis closed at a first longitudinal end by a base and a second longitudinal free end via which the container is designed to be loaded, a plug designed to close the second longitudinal free end tightly by means of a weld made at the level of a welding zone, said welding zone being offset radially towards the interior of the container, relative to the inner face of the sleeve, said container comprising a flange projecting from the inner face of the sleeve to the side of the second longitudinal free end, the plug having at least one external diameter substantially equal to at least one internal diameter of the flange, said plug being designed to be welded on said flange.

The flange is advantageously welded on the inner face of the sleeve.

Radial offset can be obtained by means of a flange fixed on the inner face of the sleeve to the side of the second longitudinal free end, the plug having at least one external diameter substantially equal to at least one internal diameter of the flange, said plug being designed to be welded on said flange.

The flange advantageously comprises a first section of larger internal diameter and a second section of smaller internal diameter connected by an annular surface forming a shoulder substantially orthogonal to the longitudinal axis, the plug comprising an external profile corresponding to the internal profile of the flange, such that the plug rests on the shoulder.

It can be provided advantageously that the container comprises handling means of the container distinct from the plug, said means being fixed to the sleeve at the level of the longitudinal free end of the sleeve, the flange being fixed in the sleeve set back from the longitudinal free end of the sleeve.

The handling means are for example formed by a cover fitted in its centre with a gripping element. The cover can advantageously comprise a rim of thickness close to the thickness of the longitudinal free end of the sleeve so as to enable welding of the cover on the sleeve without adding wire.

Advantageously, the container according to the invention can comprise loading wedging means, said wedging means being connected inside the container.

In the case where the container is circular in cross-section, the wedging means can be formed by a casing whereof the length is substantially equal to the internal length of the container and whereof the transversal cross-section is a square, the length of the diagonals of said square being substantially equal to the internal diameter of the container.

The casing can also comprise means for evacuating the heat emitted by loading.

The evacuation means of the heat comprise for example fins extending longitudinally at least on part of the outer faces of the casing in the direction of the largest dimension.

The plug comprises advantageously a first and a second connector for the draining of the container, sweeping with air from the interior of the latter and its pressurising. A discharge pipe arranged inside the container can be provided, said pipe comprising a first free end arranged in the base of the container and a second end connected to one of the connectors for suctioning water contained in the container.

Another subject-matter of the present invention is a process for loading and closing a container according to the present invention, comprising the steps of:

placing the loading inside the container, placing the plug in the flange, welding the plug on the flange without adding material.

The process of loading and closing can also comprise the subsequent step of placing gripping means on the free end of the sleeve and welding the latter on the sleeve.

BRIEF DESCRIPTION OF THE DIAGRAMS

Figure 2A:
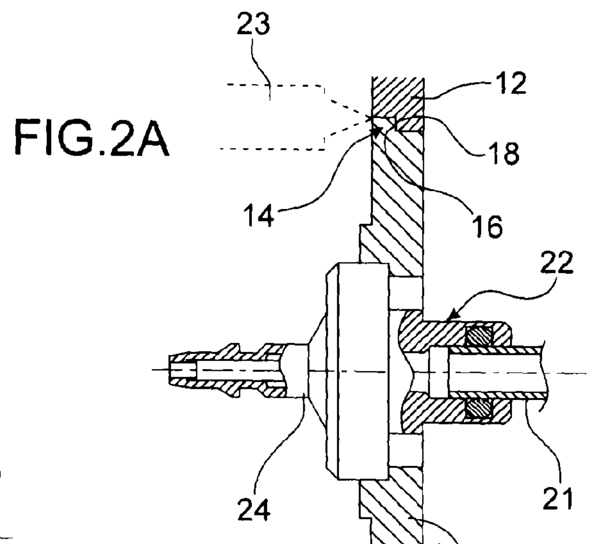
Figure 2B:
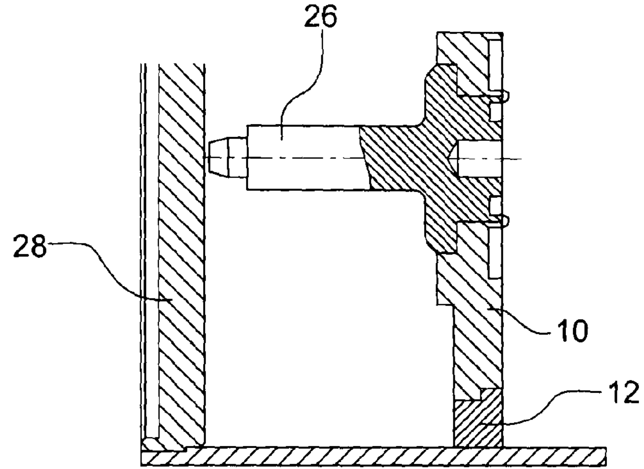
Figure 2C:
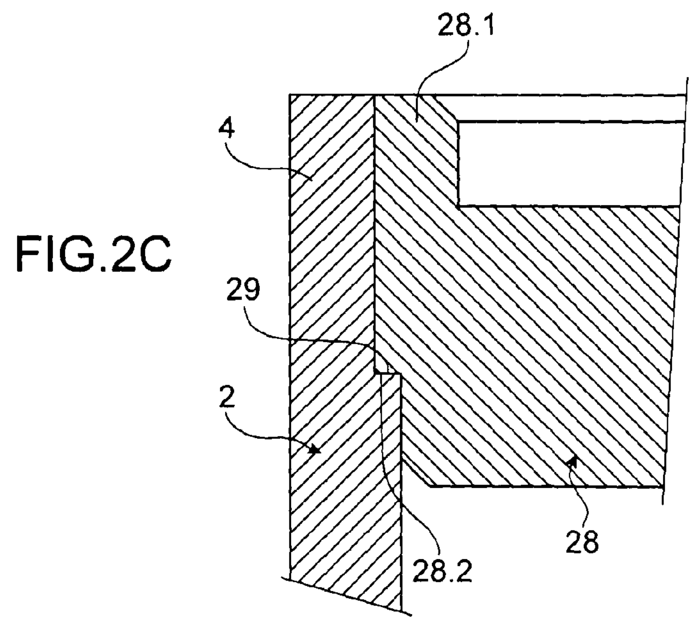
Figure 3A:
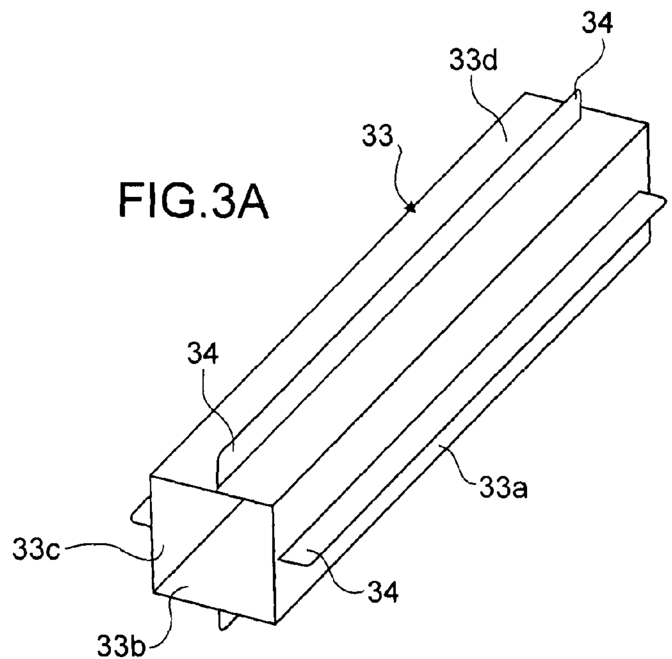
Figure 3B:
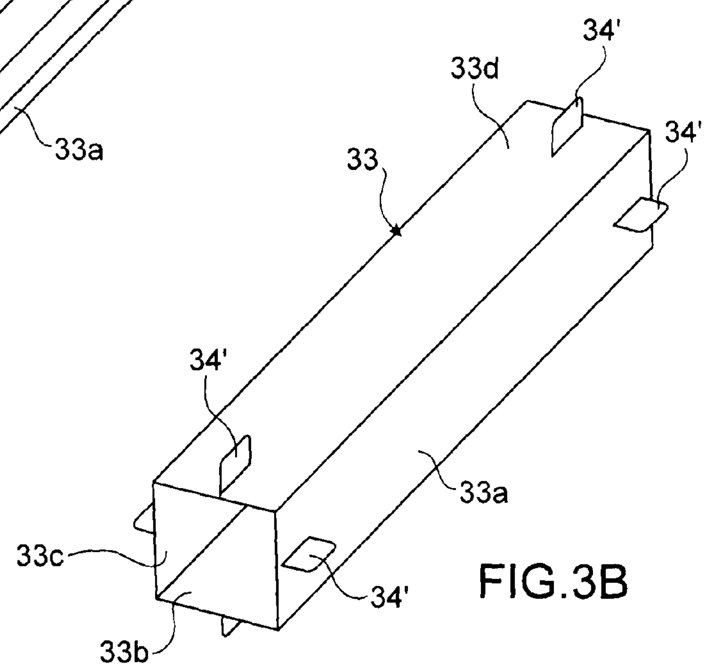
Figure 4:
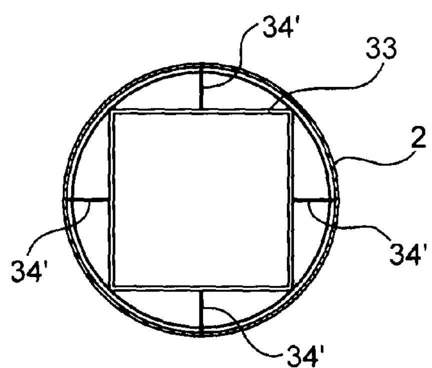

The present invention will be better understood from the following description and the attached diagrams, in which:

FIG. 1 is a longitudinal section view of an embodiment of a container according to the present invention, the spent fuel not shown, FIGS. 2A and 2B are detailed views of FIG. 1, FIG. 2C is an enlarged view of the free end of the container of FIG. 1, FIGS. 3A and 3B are perspective views of wedging means which can be arranged in the container according to the present invention, FIG. 4 is a transversal section view of FIG. 1 along the plane A-A.

DETAILED EXPLANATION OF PARTICULAR EMBODIMENTS

FIG. 1 shows an embodiment of a container according to the present invention comprising a cylindrical sleeve 2 of circular cross-section of axis X, made for example of stainless steel. The sleeve 2 comprises first 4 and second 6 longitudinal ends. The first end 4 of the sleeve 2 is closed by a plate 8 forming the base of the container. This plate 8 is fixed on the sleeve 2 for example by welding. The plate 8 and the sleeve 2 can also be made in a single piece, for example by flowturning.

The second longitudinal end 6 forms the loading end of the container and is designed to be tightly closed by a plug 10, the plug 10 being put in place when the container is loaded.

According to the present invention, an intercalary flange 12 is provided at the level of the second end 6 of the sleeve 2 on which the plug 10 is fixed.

The intercalary flange 12 is in the form of a ring fixed on the inner face of the sleeve 2 at the level of the second longitudinal end 6.

The flange 12 is more particularly visible in FIGS. 2A and 2B.

The flange 12 is welded to the inner face of the sleeve 2.

Advantageously, the flange 12 comprises an internal profile 14 in the form of a step formed by a first portion of larger internal diameter and a second portion of smaller internal diameter, said portions being connected by an annular surface 16 orthogonal to the axis X, oriented towards the exterior of the container and designed to former a support for the plug.

The outer periphery of the plug 10 comprises an external profile corresponding to that of the flange 12. The outer periphery therefore comprises a first portion of larger external diameter and a second portion of smaller external diameter connected by an annular surface 18 forming a shoulder designed to rest on the annular surface 16. The diameter of the portion of larger external diameter of the plug is substantially equal to that of the portion of larger internal diameter of the flange, and the diameter of the portion of smaller external diameter of the plug is substantially equal to that of the portion of smaller internal diameter of the flange.

According to the present invention, during closing of the container, the plug 10 is welded on the flange 12 at the level of the contact between the external contours of the portions of larger internal and external diameter of the flange 12 and of the plug 10 respectively.

Thanks to the present invention, the welding means 23 to be used (shown in dotted lines in FIG. 2B) are simpler. In fact, they do not need to assume complex orientations to attain the welding zone. Also, the weld can be made without adding extra material, simplifying the welding process and the device designed for welding. The weld is formed by fusion of the materials making up the contours of the flange 12 and of the plug 10.

It should be noted that the flange is welded on the sleeve prior to loading of the fuel; consequently its welding on the sleeve is much simpler.

The plug 10 forms a tight barrier and confines the spent fuel in the volume V delimited by the sleeve 2, the base and the plug.

For safety reasons the container with the spent fuel can be loaded under water in a pool, the plug being welded on the flange 12 under water. This loading process involves the volume V being filled with water to be discharged, therefore this volume and the fuel it contains must also be dried.

As is evident in FIG. 2A, a tube 21 designed to discharge water can be placed in the container, this tube comprising a first suction end terminating in the base of the container and a second discharge end terminating towards the plug 10, this end being designed to be connected to a first discharge connector 22 carried by the plug, the connector being attached to a connector 24 passing through the plug 10. This connector can also help to dry out the container. The plug 10 also comprises a second connector 26 for discharge of air during drying of the container and pressurisation of the container, if required.

Finally, when the different steps for closing the container are completed, these first 22, 24 and second 26 connectors measure the humidity inside the container, which verifies the performance of the container over time.

In a particularly advantageous manner and as shown in FIGS. 1 and 2B, the container comprises means 28 for handling the container without handling the plug 10.

The means 28 form a cover fixed on the sleeve, by welding directly onto the latter, this cover covering the plug 10. For this, the plug 10 is fixed in the sleeve 2 set sufficiently back from the free end of the sleeve 2, this longitudinal free end receiving the cover 28.

The main function of the cover 28 is not to seal the container, but to enable handling of the container, for example by a device suspended from an overhead crane. For this, the cover 28 comprises a gripping system 30 projecting towards the exterior. In the example illustrated, this gripping system 30 is a piece projecting at the centre of the cover. The gripping system could also be made in the form of a recess.

In this advantageous example, the sealing and handling functions are distinct. Consequently, tight fixing of the plug 1 on the sleeve via the flange 12 does not need to offer major mechanical resistance to traction, and mechanical fixing of the cover 28 on the sleeve 2 is provided to deal with traction forces during lifting of the container and is not designed to be tight. This separation of functions simplifies the making and monitoring the container.

It is understood that to further improve the level of safety of the confinement offered by the container, the fixing of the cover 28 on the sleeve 2 could be sealed.

It should be noted that since the cover is fixed at the longitudinal free end of the sleeve, its fixing by welding to the sleeve does not encounter the same difficulties as for fixing the plug 10 on the sleeve. But to simplify the overall process, the cover can be attached to the sleeve identically to that used for the plug by welding without wire. For this, and as it can be seen in FIG. 2C, the radially external periphery of the cover is formed by a ring 28.1 of thickness substantially equal to that of the end of the sleeve, which allows the making of a wireless welding. The cover 28 also comprises an annular shoulder 28.2 resting on an annular support surface 29 arranged in the inner face of the sleeve. Due to this cover design, the welding process of the plug on the flange and the welding process of the cover on the sleeve are identical and need no change in equipment, as the whole process is faster.

As a variant, the flange is made in a single piece with the sleeve, avoiding a welding step.

As shown in FIGS. 3A and 3B, the container also comprises particularly advantageously means 32 for keeping the loading arranged in the container substantially at the centre of the latter.

These wedging means 32 are formed in the example shown by a casing 33 of square cross-section whereof the dimension of the diagonals is substantially equal to the internal diameter of the container, ensuring immobilisation of the casing 33 in the container. The spent fuel is arranged inside the casing 33 which holds it laterally. The casing has a length substantially equal to that of the internal volume of the container.

In a particularly advantageous manner, the casing 33 comprises, projecting from its outer faces, cooling fins 34 facilitating evacuation of heat released by the fuel to the exterior of the container.

In FIG. 3A, the fins 34 extend over the entire length of the casing 33. In FIG. 3B, showing a variant of the wedging means, the casing 33 is equipped at each of its longitudinal ends with four fins 34' of reduced size, extending only over a limited part of the length of the casing 33. This casing 33 is for example formed by four sheets 33*a* to 33*b*. A number of fins 34 could also be distributed over the entire length of the casing 33.

FIG. 4 shows the casing 33 in the container.

It is understood that the casing can have different cross-section, for example an octagonal cross-section.

These wedging means are advantageously removable. They are put in place as needed, especially as a function of the shape of the containers.

The loading and closing steps of the container according to the present invention will now be described.

The container according to the present invention is loaded with spent nuclear fuel.

The plug 10 is then put in place in the flange 12.

Welding means (shown in dotted lines in FIG. 2B) are then brought close to the plug and the flange and weld the plug and the flange. Due to the invention, the welding means can be brought substantially parallel to the longitudinal axis X of the container, since the welding zone is easily accessible.

In the case where a handling cover 28 is provided, the latter is brought to the longitudinal free end of the container and the latter is welded, for example by the same means.

The container is then ready for handling.

Due to the invention, a container is made which can be tightly closed.

It is understood that a container whereof the plug also serves as gripping means does not depart from the scope of the present invention.

The invention claimed is:

1. A container for confining spent nuclear fuel, comprising:

a sleeve of longitudinal axis comprising a first longitudinal end closed by a base and a second longitudinal free end via which the container is configured to be loaded;

a plug configured to close the second longitudinal free end tightly by a weld made at a level of a welding zone, the welding zone being offset radially towards an interior of the container, relative to an inner face of the sleeve; and a flange projecting from the inner face of the sleeve to a side of the second longitudinal free end, the plug having at least one external diameter substantially equal to at least one internal diameter of the flange, the plug configured to be welded on the flange.

2. The container as claimed in claim 1, in which the flange is welded on the inner face of the sleeve.

3. The container as claimed in claim 2, in which the flange comprises a first section of larger internal diameter and a second section of smaller internal diameter connected by an annular surface forming a shoulder substantially orthogonal to the longitudinal axis, the plug comprising an external profile corresponding to the internal profile of the flange, such that the plug rests on the shoulder.

4. The container as claimed in claim 2, further comprising a handling device of the container distinct from the plug, the handling device being fixed to the sleeve at a level of the longitudinal free end of the sleeve, the flange being fixed in the sleeve back from the longitudinal free end of the sleeve.

5. The container as claimed in claim 4, in which the handling device includes a cover fitted in its center with a gripping element.

6. The container as claimed in claim 5, in which the cover comprises a rim of thickness close to the thickness of the longitudinal free end of the sleeve so as to enable welding of the cover on the sleeve without adding wire.

7. The container as claimed in claim 1, further comprising a wedging device of loading, the wedging device being mounted in the container.

8. The container as claimed in claim 7, the container being circular in cross-section, the wedging device comprising a casing whereof a length is substantially equal to that of the interior of the container and whereof transversal cross-section is a square, length of diagonals of the square being substantially equal to the internal diameter of the container.

9. The container as claimed in claim 8, in which the casing comprises a heat sink of heat emitted by loading.

10. The container as claimed in claim 9, in which the heat sink comprises fins extending longitudinally at least on one part of outer faces of the casing in a direction of largest dimension.

11. The container as claimed in claim 1, in which the plug comprises a first and a second connector for draining the container, sweeping with air of the interior of the container and its pressurizing.

12. The container as claimed in claim 11, further comprising a discharge pipe arranged inside the container, the pipe comprising a first free end arranged in the base of the container and a second end connected to one of connectors for suctioning water contained in the container.

13. A process for loading and closing a container for confining spent nuclear fuel including:

a sleeve of longitudinal axis including a first longitudinal end closed by a base and a second longitudinal free end via which the container is configured to be loaded, a plug configured to close the second longitudinal free end tightly by a weld made at a level of a welding zone, the welding zone being offset radially towards an interior of the container, relative to an inner face of the sleeve, a flange projecting from the inner face of the sleeve to a side of the second longitudinal free end, the plug having at least one external diameter substantially equal to at least one internal diameter of the flange, the plug configured to be welded on the flange, the process comprising:

placing the loading inside the container;

placing the plug in the flange;

welding the plug on the flange without adding material.

14. A process for loading and closing, as claimed in claim 13, further comprising a subsequent placing a handling device on the longitudinal free end of the sleeve and welding the handling device on the sleeve.

* * * * *